(12) United States Patent
Jung et al.

(10) Patent No.: US 11,325,667 B2
(45) Date of Patent: May 10, 2022

(54) SYSTEM FOR CHANGING HEIGHT OF HANGER MOUNTING PLATE

(71) Applicants: Hyundai Motor Company, Seoul (KR); Kia Motors Corporation, Seoul (KR)

(72) Inventors: Young Jin Jung, Cheonan-si (KR); Sangduck Han, Anyang-si (KR); Jung Jin Kim, Bongdong-eup (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 703 days.

(21) Appl. No.: 16/209,730

(22) Filed: Dec. 4, 2018

(65) Prior Publication Data
US 2019/0185086 A1 Jun. 20, 2019

(30) Foreign Application Priority Data
Dec. 20, 2017 (KR) .................. 10-2017-0175707

(51) Int. Cl.
*B23Q 3/18* (2006.01)
*B62D 65/02* (2006.01)
*B25B 11/02* (2006.01)
*B65G 17/20* (2006.01)
*B65G 17/32* (2006.01)
(Continued)

(52) U.S. Cl.
CPC ............ *B62D 65/026* (2013.01); *B25B 11/02* (2013.01); *B65G 17/20* (2013.01); *B65G 17/32* (2013.01); *B23K 11/002* (2013.01); *B60Y 2304/074* (2013.01); *B60Y 2410/12* (2013.01); *B62D 65/18* (2013.01)

(58) Field of Classification Search
CPC ...... B62D 65/026; B62D 65/18; B65G 17/32; B25B 11/02; B60Y 2410/12; B60Y 2304/074; B23K 11/002
USPC .............................. 269/58, 24, 25, 228, 311
See application file for complete search history.

(56) References Cited

U.S. PATENT DOCUMENTS

| | | | |
|---|---|---|---|
| 4,928,386 A * | 5/1990 | Schupp .................. | B62D 65/02 108/138 |
| 8,800,981 B2 * | 8/2014 | Jeong .................... | B62D 65/026 269/25 |
| 2018/0162470 A1 * | 6/2018 | Kim ........................ | B23K 11/11 |

FOREIGN PATENT DOCUMENTS

| | | |
|---|---|---|
| CN | 103448835 A | 12/2013 |
| KR | 100802744 B1 | 2/2008 |

(Continued)

*Primary Examiner* — Joseph J Hail
*Assistant Examiner* — Shantese L McDonald
(74) *Attorney, Agent, or Firm* — Morgan, Lewis & Bockius LLP

(57) ABSTRACT

A system for changing a height of a hanger mounting plate, may include a frame; a hanger arm fixing device mounted at an upper side of the frame in a longitudinal direction of the vehicle body to be movable in the longitudinal direction of the vehicle body and fixing both sides of the connecting blocks; a pin fixing device which is mounted at a center portion of the frame to be movable in a width direction of the vehicle body and separates or couples the coupling pin from/to the connecting block; and a mounting plate height adjusting device mounted at a lower side of the center portion of the frame to be movable in the height direction of the vehicle body in a state in which the mounting plate height adjusting device supports a lower portion of the mounting plate, and adjusting a height of the mounting plate.

10 Claims, 6 Drawing Sheets

(51) Int. Cl.
  *B62D 65/18* (2006.01)
  *B23K 11/00* (2006.01)

(56) References Cited

FOREIGN PATENT DOCUMENTS

| | | |
|---|---|---|
| KR | 1020100051145 A | 5/2010 |
| KR | 100965098 B1 | 6/2010 |

* cited by examiner

SYSTEM FOR CHANGING HEIGHT OF HANGER MOUNTING PLATE

CROSS-REFERENCE TO RELATED APPLICATION

The present application claims priority to Korean Patent Application No. 10-2017-0175707 filed on Dec. 20, 2017, the entire contents of which is incorporated herein for all purposes by this reference.

BACKGROUND OF THE INVENTION

Field of the Invention

The present invention relates to a system for changing a height of a hanger mounting plate which may convey vehicle bodies having various shapes during processes of assembling and producing the vehicle bodies, improving productivity and reducing costs.

Description of Related Art

In general, a vehicle maker produces a vehicle by assembling several tens of thousands of components through several steps of an assembly process and a welding process in an entire mass-production process.

During the process of mass-producing vehicle bodies, the welding process occupies a greater portion of the process of assembling the vehicle bodies. As the welding process is automated by a conveyance carriage or a robot hanger that conveys vehicle body panels, a working process may be efficiently managed.

To keep up with a tendency of factory automation as described above, researches and developments on the robot hanger are continuously being conducted for effectively operating and managing the robot hanger.

According to a clamp conveyance method using a robot, several devices for a single type of vehicle are prepared, and grippers or the like are changed by a tool changing device to cope with various types of vehicles However, there is a demand for spaces for accommodating several tools, and waste of time may be caused when changing the tools.

As another method for coping with various types of vehicles, there is a method of changing positions of grippers by use of several air cylinders. However, the present method has a restriction due to a weight and may be applied to change components having similar shapes.

As described above, the clamp conveyance method, which utilizes the robot to cope with various types of vehicles, is severely insufficient such as a spatial restriction, time consumption, and a limitation in compatibility.

Therefore, a method of conveying a vehicle body by use of a hanger has been introduced, but the hanger has a problem in that a height of a hanger arm needs to be manually adjusted in accordance with types of vehicle bodies to convey various types of vehicle bodies, which causes deterioration in productivity.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system for changing a height of a hanger mounting plate which may change the height of the hanger mounting plate in accordance with types of vehicle bodies, improving efficiency in conveying the vehicle body and improving overall productivity.

Various aspects of the present invention are directed to providing a system for changing a height of a hanger mounting plate which is disposed at least one side of a hanger frame 135, and may include hanger arms 125 each including an upper arm 120, a lower arm 130 which is mounted with a mounting plate 145 and has multiple first holes 105 formed in a height direction of a vehicle body, and a connecting block 100 which is fixed to the upper arm 120 and has at least one second hole 115 formed in the height direction of the vehicle body, in which the upper arm 120 and the lower arm 130 are coupled to each other by a coupling pin 110 that simultaneously penetrates one of the first holes 105 and the at least one second hole 115, and a height of the mounting plate 145 is changed by adjusting the first hole 105 penetrated by the coupling pin 110, the system including: a frame 150; hanger arm fixing devices 160 which are mounted at both sides of an upper side of the frame 150 in a longitudinal direction of the vehicle body to be movable in the longitudinal direction of the vehicle body and fix both sides of the connecting blocks 100; a pin fixing device 165 which is mounted at a center portion of the frame 150 to be movable in a width direction of the vehicle body and separates or couples the coupling pin 110 from/to the connecting block 100; and a mounting plate height adjusting device 170 which is mounted at a lower side of the center portion of the frame 150 to be movable in the height direction of the vehicle body in a state in which the mounting plate height adjusting device 170 supports a lower portion of the mounting plate 145, and adjusts a height of the mounting plate 145.

The system may further include: a hanger detecting sensor 175 which detects whether the hanger arm 125 enters the frame 150; and a position detecting sensor 180 which detects a vertical position of the mounting plate 145 based on the height direction of the vehicle body.

The hanger arm fixing devices 160 may include: pressing pads 200 which support both surfaces of the connecting blocks 100, respectively; pressing cylinders 205 which press the pressing pads 200 against the connecting blocks 100; cylinder mounting brackets 210 on which the pressing cylinders 205 are mounted; and bracket cylinders 215 which moves the cylinder mounting brackets 210 in the width direction of the vehicle body.

The pin fixing device 165 may include: a pin clamp 220 which is configured to clamp a head portion of the coupling pin 110; a clamp mounting bracket 225 on which the pin clamp 220 is mounted; and a clamp cylinder 230 which moves the clamp mounting bracket 225 in the width direction of the vehicle body along a clamp rail 224 mounted on a lower surface of the clamp mounting bracket 225.

The pin fixing device 165 may further include: a first return elastic member 300 which applies elastic force so that the clamp mounting bracket 225 returns to a movement reference point when linear displacement of the clamp mounting bracket 225 occurs in left and right directions based on the width direction of the vehicle body during a process of coupling the pin clamp 220 to the head portion of the coupling pin 110; and a second return elastic member 305 which applies elastic force so that the clamp mounting bracket 225 returns to a rotation reference point when angular displacement of the clamp mounting bracket 225 occurs in the left and right directions based on the width direction of the vehicle body during the process of coupling the pin clamp 220 to the head portion of the coupling pin 110.

The mounting plate height adjusting device 170 may include: a height adjusting bracket 310 which is disposed to push upward a lower surface of the mounting plate 145 in the height direction of the vehicle body; and a moving unit 320 which moves the height adjusting bracket 310 upwardly or downwardly in the height direction of the vehicle body.

The moving unit 320 may include: a linear screw 330 which is connected to a rotation shaft of a motor; and a screw body 340 which is fixed to the height adjusting bracket 310 and coupled to the linear screw 330 in a threaded engagement.

The pin fixing device 165 may include: a pin clamp 220 which is configured to clamp a head portion of the coupling pin 110; a clamp mounting bracket 225 on which the pin clamp 220 is mounted; and a clamp cylinder 230 which moves the clamp mounting bracket 225 in the width direction of the vehicle body along a clamp rail 224 mounted on a lower surface of the clamp mounting bracket 225, and the pin fixing device 165 and the height adjusting bracket 310 may be fixed to each other and disposed to move together in the height direction of the vehicle body.

The system for changing a height of a hanger according to the exemplary embodiment of the present invention is disposed on a movement route along which the hanger moves, and automatically adjusts a height of the hanger in accordance with types of vehicle bodies, and as a result, it is possible to improve overall productivity of the vehicle bodies.

The hanger arm fixing devices may easily fix the hanger arms by pressing the pressing members against both surfaces of the connecting blocks mounted on the hanger, and the pin fixing device may remove the coupling pin for connecting the upper arm and the lower arm to separate the upper arm and the lower arm, adjust a height of the lower arm, and then connect the upper arm and the lower arm.

Furthermore, in a state in which the pin fixing device removes the coupling pin, the mounting plate height adjusting device may easily adjust the height of the lower arm.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
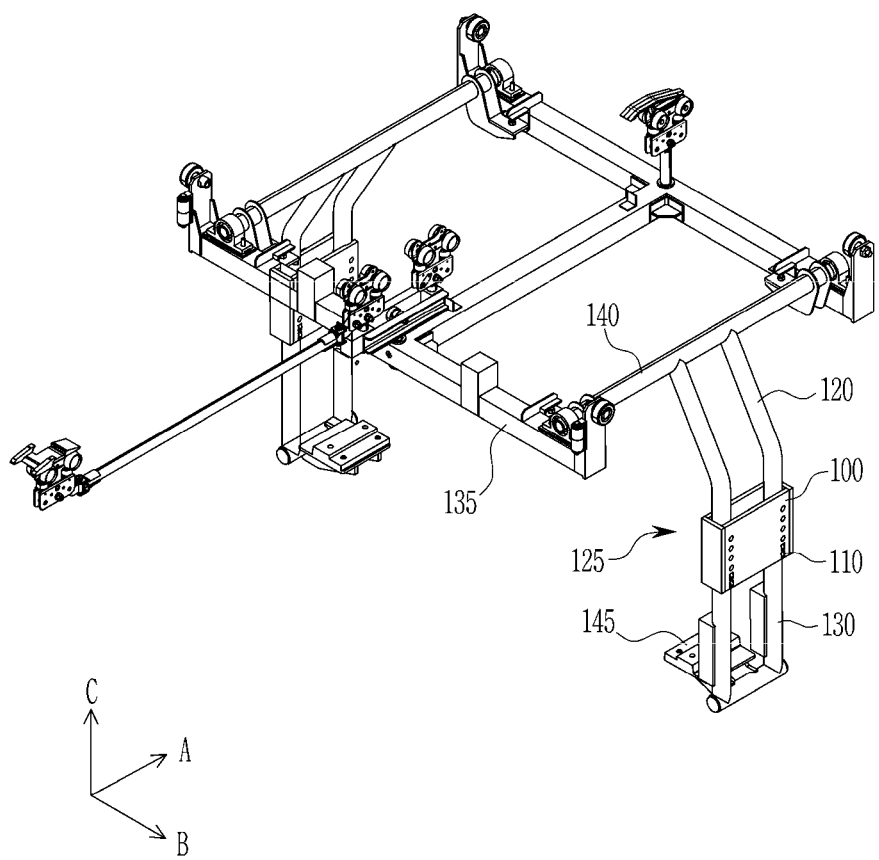
FIG. 1 is a perspective view exemplarily illustrating a portion of a system for changing a height of a hanger mounting plate according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary embodiment of the present invention will be described in detail with reference to the accompanying drawings.

The size and thickness of each component illustrated in the drawings are arbitrarily shown for understanding and ease of description, but the present invention is not limited thereto. Thicknesses of several portions and regions are enlarged for clearly describing the above.

A portion irrelevant to the description will be omitted to clearly describe the exemplary embodiments of the present invention, and the same or similar constituent elements will be designated by the same reference numerals throughout the specification.

In the following description, names of constituent elements are classified as a first . . . , a second . . . , and the like to discriminate the constituent elements having the same name, and the names are not essentially limited to the order in the description below.

In the exemplary embodiment and the drawings, an A direction means a longitudinal direction of a vehicle body, a B direction means a width direction of the vehicle body, and a C direction means a height direction of the vehicle body.

FIG. 1 is a perspective view exemplarily illustrating a hanger arm 125 of a system for changing a height of a hanger mounting plate according to an exemplary embodiment of the present invention.

Referring to FIG. 1, the system for changing a height of the hanger mounting plate includes a hanger frame 135, rotation shafts 140, and the hanger arms 125, and the hanger arm 125 includes a connecting block 100, coupling pins 110, an upper arm 120, a lower arm 130, and a mounting plate 145.

The hanger frame 135 moves along a predetermined route, and the hanger arms 125 are mounted at both sides of the hanger frame 135 which are in parallel to a longitudinal direction (A direction) of a vehicle body.

The mounting plate 145 is mounted at a lower end portion of the hanger arm 125, and the vehicle body is mounted and conveyed on the mounting plate 145.

Figure 2:
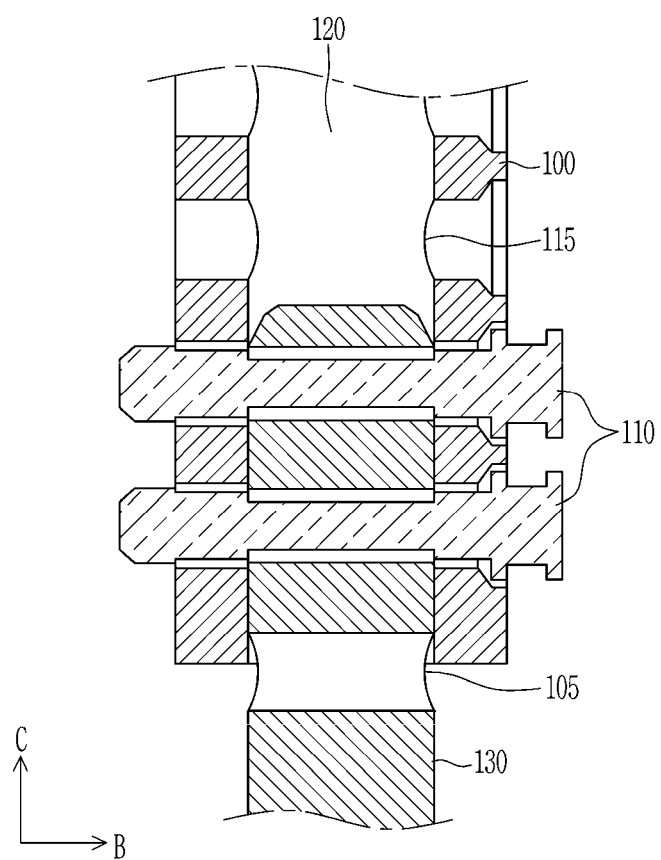
FIG. 2 is a cross-sectional view of a portion of the hanger arm according to the exemplary embodiment of the present invention.

FIG. 2 is a cross-sectional view of a portion of the hanger arm according to the exemplary embodiment of the present invention.

Referring to FIG. 2, multiple first holes 105 are formed in the lower arm 130 in a height direction (C direction) of the vehicle body. At least one second hole 115 is formed, in the height direction (C direction) of the vehicle body, in the connecting block 100 fixed to the upper arm 120. An upper end portion of the lower arm 130 is inserted into a lower end portion of the upper arm 120, and a portion of the first hole 105 may be aligned with the second hole 115.

The coupling pin 110 simultaneously penetrates the one or more first holes 105 of the lower arm and the at least one second hole 115 of the connecting block 100, coupling the upper arm 120 and the lower arm 130. Furthermore, the upper arm 120 and the lower arm 130 may be separated from each other by separating the coupling pin 110 from the first hole 105 and the second hole 115.

That is, to change the height of the hanger mounting plate, the upper arm 120 and the lower arm 130 are separated from each other by separating the coupling pin 110 from the first hole 105 and the second hole 115. Thereafter, the upper end portion of the lower arm 130 is inserted into the upper arm 120 in accordance with the height of the hanger mounting plate in accordance with the vehicle body. When the first hole 105 is aligned at a position of the second hole 115, the coupling pin 110 penetrates the first hole 105 and the second hole 115 to couple the upper arm 120 and lower arm 130.

Figure 3:
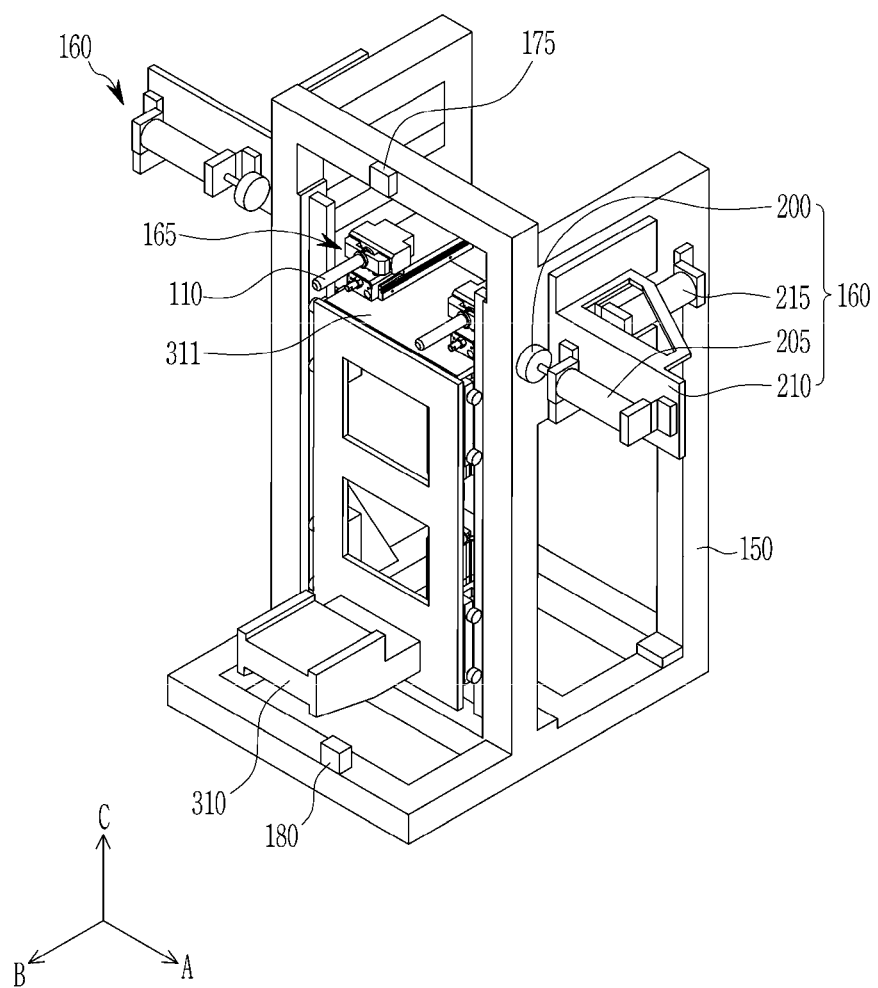
FIG. 3 is a perspective view exemplarily illustrating an apparatus configured for changing a height of the hanger mounting plate according to the exemplary embodiment of the present invention.
Figure 4:
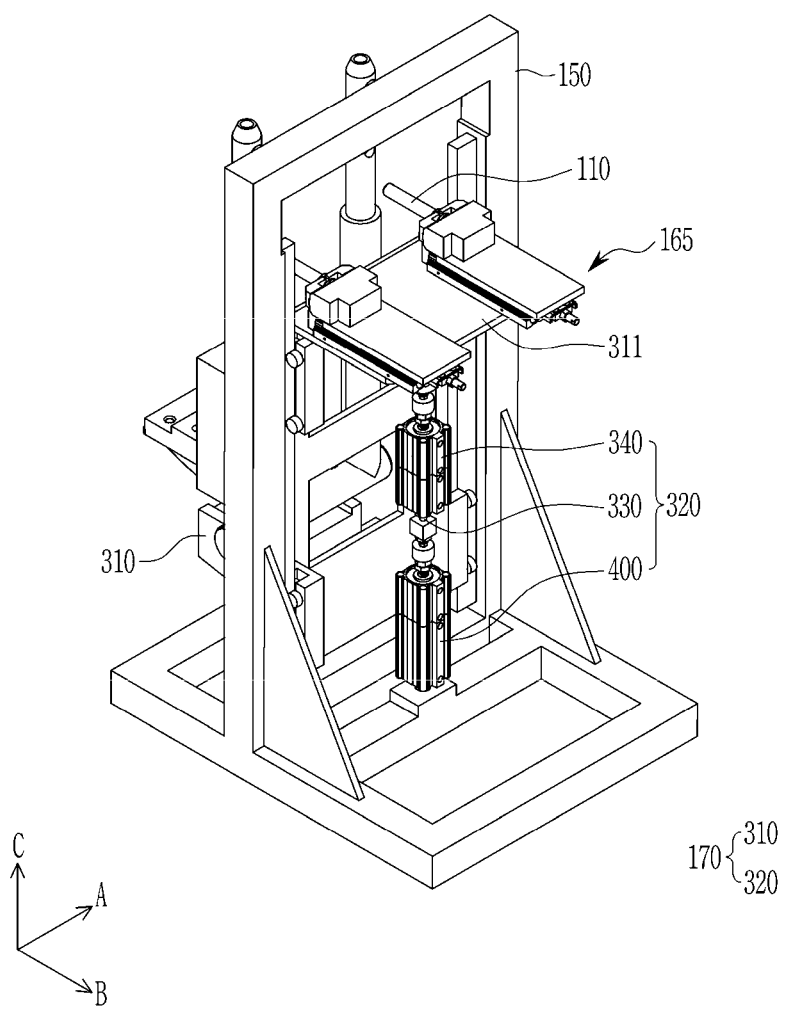
FIG. 4 is a perspective view of a portion of the apparatus configured for changing a height of the hanger mounting plate according to the exemplary embodiment of the present invention.

FIG. 3 and FIG. 4 are perspective views illustrating an apparatus configured for changing a height of the hanger mounting plate according to the exemplary embodiment of the present invention. FIG. 3 is a perspective view exemplarily illustrating a side of the apparatus configured for changing a height of the hanger mounting plate at which the hanger arm 125 is coupled, and FIG. 4 is a perspective view exemplarily illustrating a pin fixing device 165 and a mounting plate height adjusting device 170 at a rear side of the apparatus.

Referring to FIG. 3 and FIG. 4, the apparatus configured for changing a height of the hanger mounting plate includes a frame 150, hanger arm fixing devices 160, the pin fixing device 165, the mounting plate height adjusting device 170, a hanger detecting sensor 175, and a position monitoring sensor 180.

Referring to FIG. 3, the hanger arm fixing devices 160 are mounted at both sides at an upper side of the frame 150 in the longitudinal direction (A direction) of the vehicle body to fix both sides of the connecting block 100, and each of the hanger arm fixing devices 160 may include a pressing pad 200, a pressing cylinder 205, a cylinder mounting bracket 210, and a bracket cylinder 215.

The bracket cylinders 215 are mounted at both sides of the upper side of the frame 150 in the longitudinal direction (A direction) of the vehicle body. The bracket cylinders 215 may move the cylinder mounting brackets 210 in a width direction (B direction) of the vehicle body so that the cylinder mounting brackets 210 are positioned at both sides of the connecting blocks. Therefore, the bracket cylinder 215 may fix a position of the vehicle body in the width direction (B direction) at which the coupling pin 110 is coupled to the connecting block. The pressing cylinder 205 is disposed at a front side of the cylinder mounting bracket 210, and the pressing cylinder 205 may move the pressing pad 200 in the longitudinal direction (A direction) of the vehicle body. Here, the pressing pads 200 support both surfaces of the connecting blocks 100 in the longitudinal direction (A direction) of the vehicle body. Therefore, the pressing cylinder 205 may press the pressing pad 200, fixing a position of the vehicle body in the longitudinal direction (A direction) at which the coupling pin 110 is coupled to the connecting block 100.

The pin fixing device 165 is mounted on an upper surface of the plate 311 and moves in the width direction (B direction) of the vehicle body, separating or coupling the coupling pin 110 from/to the connecting block. A detailed description will be provided with reference to FIG. 5.

The hanger detecting sensor 175 is mounted on one surface at the upper side of the frame 150 which faces the vehicle body, and the hanger detecting sensor 175 detects whether the hanger arm 125 enters the frame 150.

The position monitoring sensor 180 is mounted on an upper surface at a lower end portion of the frame 150, detecting a height of a height adjusting bracket 310.

Referring to FIG. 3 and FIG. 4, the mounting plate height adjusting device 170 is mounted at a lower end portion of the frame 150 and may move in the height direction (C direction) of the vehicle body. The mounting plate height adjusting device 170 includes a height adjusting bracket 310, and a moving unit 320 which moves the height adjusting bracket 310 in the height direction (C direction) of the vehicle body.

The pin fixing device 165 is mounted on the plate 311 provided at an upper side of the height adjusting bracket 310. Therefore, the height adjusting bracket 310 and the pin fixing device 165 may move together in the height direction (C direction) of the vehicle body.

Referring to FIG. 4, the moving unit 320, which moves the height adjusting bracket 310 upwardly and downwardly in the height direction (C direction) of the vehicle body, includes a motor 400, a linear screw 330, and a screw body 340.

The moving unit 320 is connected to an upper surface of a lower portion of the frame 150 and a lower surface of the plate 311.

The motor 400 is fixed to the upper surface of the lower portion of the frame 150, and the linear screw 330 is connected to the motor 400 and extends upward.

Furthermore, the screw body 340 is fixed to the lower surface of the plate 311, and the linear screw 330 penetrates the screw body 340 and is coupled to the motor 400 by a threaded engagement.

The mounting plate 145 moves upward when the motor 400 rotates the linear screw 330 in one direction thereof, and on the other hand, the mounting plate 145 moves downward when the motor 400 rotates the linear screw 330 in the other direction thereof.

Figure 5:
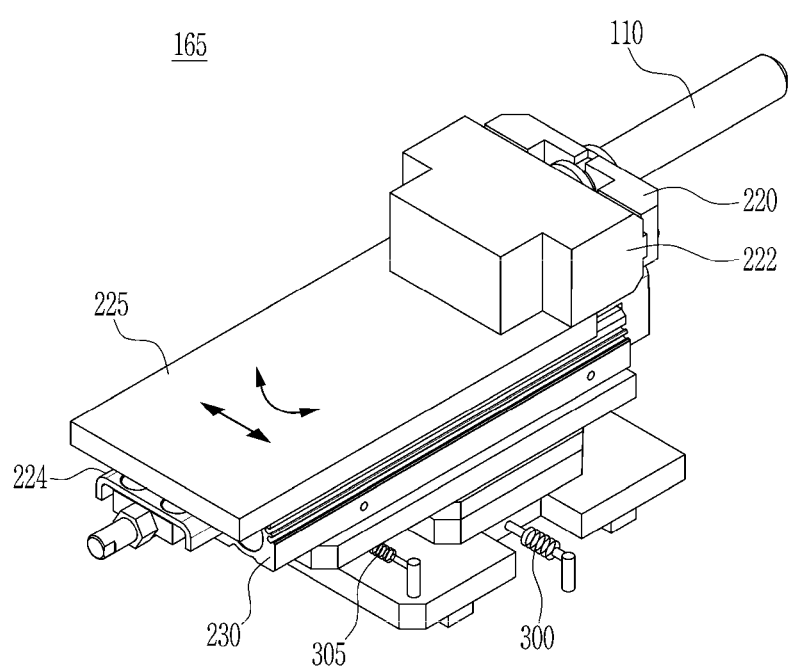
FIG. 5 is a perspective view of a pin fixing device of the apparatus configured for changing a height of the hanger mounting plate according to the exemplary embodiment of the present invention.

FIG. 5 is a perspective view of the pin fixing device of the apparatus configured for changing a height of the hanger mounting plate according to the exemplary embodiment of the present invention.

Referring to FIG. 5, the pin fixing device 165 includes a pin clamp 220, a clamp actuator 222, a clamp mounting bracket 225, a clamp rail 224, a clamp cylinder 230, a first return elastic member 300, and a second return elastic member 305.

Referring to FIG. 5, the clamp actuator 222 is disposed on the clamp mounting bracket 225, and the clamp actuator 222 operates the pin clamp 220.

The pin clamp 220 may separate the upper arm 120 and the lower arm 130 by holding and pulling a head portion of the coupling pin 110, and may couple the upper arm 120 and the lower arm 130 by pushing the coupling pin 110.

The clamp cylinder 230 may move the clamp mounting bracket 225 along the clamp rail 224 in the width direction (B direction) of the vehicle body, and may move the coupling pin 110 in the width direction (B direction) of the vehicle body through the pin clamp 220.

During the process of coupling the pin clamp 220 to the coupling pin 110, angular displacement (rotations) of the pin clamp 220 and the clamp cylinder 230 may occur due to a deviating angle in left and right directions based on the width direction (B direction) of the vehicle body, and linear displacement of the pin clamp 220 and the clamp cylinder 230 may occur in the left and right directions based on the width direction (B direction) of the vehicle body.

In the instant case, the second return elastic member 305 may apply elastic force in a direction opposite to a direction of the angular displacement so that the clamp cylinder 230 and the pin clamp 220 return to a rotation center point. The first return elastic member 300 may apply elastic force in a direction opposite to a direction of the linear displacement so that the clamp cylinder 230 and the pin clamp 220 return to a movement center point.

That is, the second return elastic member 305 compensates for an angle that deviates when the pin clamp 220 is coupled to the coupling pin 110, and the first return elastic member 300 compensates for deviating displacement. Therefore, the coupling pin 110 and the pin clamp 220 are easily coupled to each other.

Figure 6:
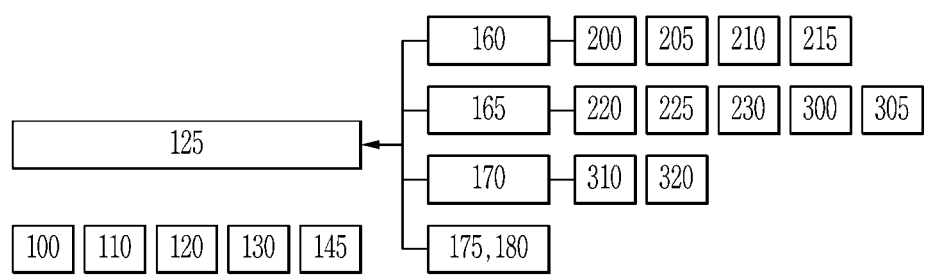
FIG. 6 is a schematic configuration view of the system for changing a height of the hanger mounting plate which may include a hanger arm and the apparatus configured for changing a height of the hanger mounting plate according to the exemplary embodiment of the present invention.

FIG. 6 is a schematic configuration view of the system for changing a height of the hanger mounting plate which includes the hanger arm 125 and the apparatus configured for changing a height of the hanger mounting plate according to the exemplary embodiment of the present invention.

Referring to FIG. 6, the hanger arm 125 includes the connecting block 100, the coupling pin 110, the upper arm 120, the lower arm 130, and the mounting plate 145, and the apparatus configured for changing a height of the hanger mounting plate includes the hanger arm fixing device 160, the pin fixing device 165, the mounting plate height adjusting device 170, and the sensor units 175 and 180.

The hanger arm fixing devices 160 are configured at both sides of the upper side of the frame in the longitudinal direction (A direction) of the vehicle body to be movable in the longitudinal direction (A direction) of the vehicle body, and the hanger arm fixing devices 160 fix both sides of the connecting blocks 100.

The pin fixing device 165 is configured at a center portion of the frame to be movable in the height direction (C direction) of the vehicle body, and the pin fixing device 165 separates or couples the coupling pin 110 from/to the connecting block 100.

The mounting plate height adjusting device 170 is configured at a lower side of the center portion of the frame and adjusts a height of the mounting plate 145 while operating together with the pin fixing device 165 in a state in which the mounting plate height adjusting device 170 supports a lower portion of the mounting plate 145.

Furthermore, the sensor units include the hanger detecting sensor 175 and the position monitoring sensor 180, and the mounting plate height adjusting device 170 includes the height adjusting bracket 310 and the moving unit 320.

Therefore, according to the apparatus configured for changing a height of the hanger mounting plate according to an exemplary embodiment of the present invention, when the hanger arm 125 is stopped, the hanger arm fixing device 165 fixes both sides of the connecting blocks 100 in the longitudinal direction (A direction) of the vehicle body in which the coupling pin 110 is coupled to the connecting block 100 and in the width direction (B direction) of the vehicle body. Thereafter, the coupling pin 110 is separated from the connecting block 100 by the pin fixing device 165. The mounting plate height adjusting device 170 operates the moving unit 320 to adjust a height of the mounting plate 145 in accordance with a height of the vehicle body. Thereafter, the pin fixing device 165 couples the coupling pin 110 to the connecting block 100.

While the present invention has been described in connection with what is presently considered to be practical exemplary embodiments of the present invention, it is to be understood that the present invention is not limited to the included exemplary embodiments. On the other hand, it is directed to cover various modifications and equivalent claims as well as various alternatives and modifications thereof. It is intended that the scope of the present invention be defined by the Claims appended hereto and their equivalents."

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for changing a height of a hanger mounting plate which is mounted at at least a side of a hanger frame, and includes hanger arms, wherein each of the hanger arms include an upper arm, a lower arm which is mounted with a mounting plate and has a plurality of first holes formed in a height direction of a vehicle body, and a connecting block which is fixed to the upper arm and has at least one second hole formed in the height direction of the vehicle body, in which the upper arm and the lower arm are coupled to each other by a coupling pin that penetrates one of the first holes and the at least one second hole, and a height of the mounting plate is changed by adjusting a hole penetrated by the coupling pin among the plurality of first holes, the system comprising:
   a vehicle body;
   a frame;
   hanger arm fixing devices which are mounted at a first side and a second side of an upper side of the frame in a longitudinal direction of the vehicle body to be movable in the longitudinal direction of the vehicle body and fix a first side and a second side of the connecting block;
a pin fixing device which is mounted at a center portion of the frame to be movable in a width direction of the vehicle body and separates or couples the coupling pin from/to the connecting block; and
a mounting plate height adjusting device which is mounted at a lower side of the center portion of the frame to be movable in the height direction of the vehicle body in a state in which the mounting plate height adjusting device supports a lower portion of the mounting plate, and adjusts the height of the mounting plate.

2. The system of claim 1, further including:
a hanger detecting sensor which detects when the hanger arms enter the frame; and
a position detecting sensor which detects a vertical position of the mounting plate based on the height direction of the vehicle body.

3. The system of claim 1, wherein the hanger arm fixing devices include:
pressing pads, each of which is configured to support a first surface and a second surface of the connecting block, respectively;
pressing cylinders which are coupled to the pressing pads and configured to press the pressing pads against the connecting block;
cylinder mounting brackets on which the pressing cylinders are mounted, respectively; and
bracket cylinders which are coupled to the cylinder mounting brackets and configured to move the cylinder mounting brackets in the width direction of the vehicle body.

4. The system of claim 1, wherein the pin fixing device includes:
a pin clamp which is configured to clamp a head portion of the coupling pin;
a clamp mounting bracket on which the pin clamp is mounted; and
a clamp cylinder which is engaged to the clamp mounting bracket to move the clamp mounting bracket in the width direction of the vehicle body along a clamp rail disposed on a lower surface of the clamp mounting bracket.

5. The system of claim 4, wherein the pin fixing device further includes:
a clamp actuator disposed on the clamp mounting bracket and configured to operate the pin clamp.

6. The system of claim 4, wherein the pin fixing device further includes:
a first return elastic member which applies elastic force to the clamp mounting bracket so that the clamp mounting bracket returns to a movement reference point when linear displacement of the clamp mounting bracket occurs in first and second directions based on the width direction of the vehicle body during a process of coupling the pin clamp to the head portion of the coupling pin; and
a second return elastic member which applies elastic force to the clamp mounting bracket so that the clamp mounting bracket returns to a rotation reference point when angular displacement of the clamp mounting bracket occurs in the first and second directions based on the width direction of the vehicle body during the process of coupling the pin clamp to the head portion of the coupling pin.

7. The system of claim 1, wherein the mounting plate height adjusting device includes:
a height adjusting bracket which is mounted to push upward a lower surface of the mounting plate in the height direction of the vehicle body; and
a moving unit which moves the height adjusting bracket upwardly or downwardly in the height direction of the vehicle body.

8. The system of claim 7, wherein the moving unit includes:
a linear screw which is connected to a rotation shaft of an actuator; and
a screw body which is fixed to the height adjusting bracket and coupled to the linear screw in a threaded engagement.

9. The system of claim 7,
wherein the pin fixing device includes:
a pin clamp which is configured to clamp a head portion of the coupling pin;
a clamp mounting bracket on which the pin clamp is mounted; and
a clamp cylinder which is engaged to the clamp mounting bracket to move the clamp mounting bracket in the width direction of the vehicle body along a clamp rail mounted on a lower surface of the clamp mounting bracket, and
wherein the pin fixing device and the height adjusting bracket are fixed to each other and mounted to move together in the height direction of the vehicle body.

10. The system of claim 9, wherein the pin fixing device further includes:
a clamp actuator disposed on the clamp mounting bracket and configured to operate the pin clamp.

* * * * *